B. R. Hand,
Washing Machine.
No. 102,395. Patented Apr. 26, 1870.
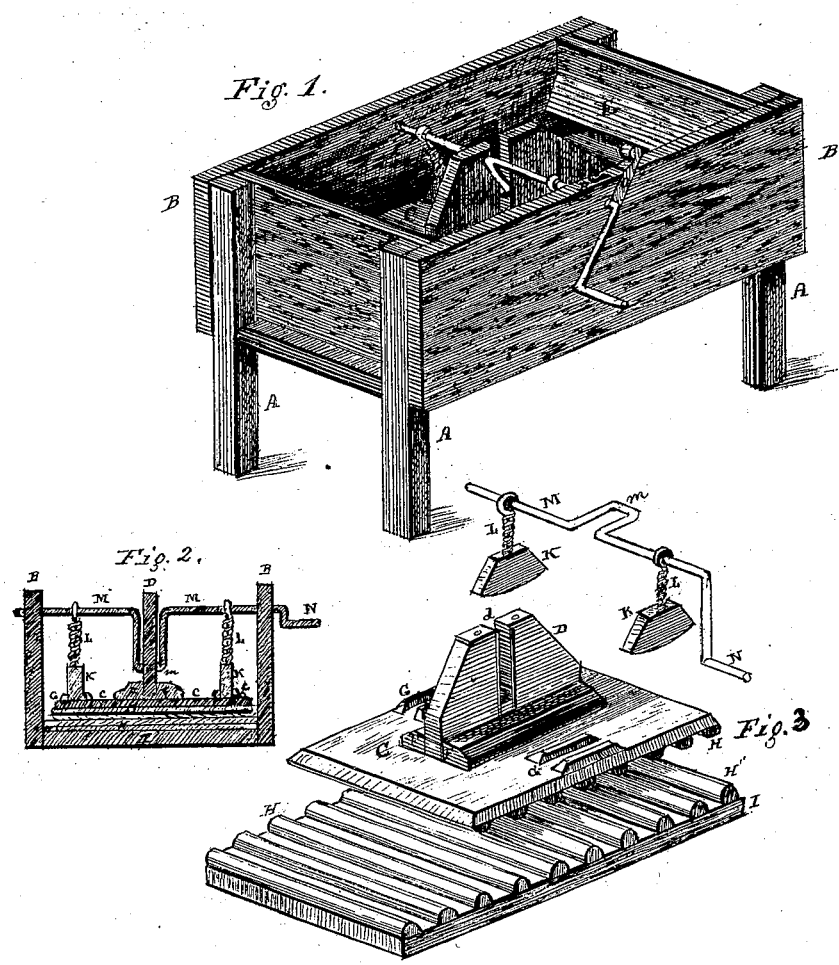
Witnesses.
W. B. Wiley
Jacob Stauffer
Inventor.
B. R. Hand

United States Patent Office.

BENJAMIN R. HAND, OF LANCASTER, PENNSYLVANIA, ASSIGNOR TO HIMSELF, S. J. EBY, AND B. S. TROUT, OF SAME PLACE.

Letters Patent No. 102,395, dated April 26, 1870.

---

IMPROVED WASHING-MACHINE.

---

The Schedule referred to in these Letters Patent and making part of the same.

---

I, BENJAMIN R. HAND, of Lancaster, in the State of Pennsylvania, have invented certain Improvements on Washing-Machines, of which the following is a specification.

The nature of my invention consists in the manner of moving or operating a horizontal fluted, or otherwise corrugated, rubber, over a similar corrugated fixed bottom, with the goods to be washed between them, in a box or tub, clearly illustrated by the accompanying drawings, in which—

Figure 1 is a perspective view of my machine, showing the box B, on legs A, the crank m, in the slot d of the head-piece D, raised vertically on the center of the rubbing-board C, the rod M sustaining the spring and rocking-pressure appliances L K on the sides, said rod M forming the crank m and handle N. To prevent the suds from splashing out, inclined shelves E are affixed across the box, inside, on each end.

Figure 2 is a cross-section of the machine, and

Figures 3 perspective views of the several parts detached.

The construction is very simple and easily understood, so as to enable any one skilled in the art to make and use my invention.

Figure 1, shows the position of the handle N, which, by vibrating say a quarter circle to the right and left, causes the free crank portion m, in the slot d of the head-piece D, to propel the rubber C to the right and left, over the material, said rubber being so much shorter than the bottom I as to allow the desired length of stroke. Said slot d can be lined with brass or zinc to protect it from wear, and a friction-roller might also be affixed on the portion m of the crank.

This head D is secured by a base, F, on the rubber-board C, which has also guide-strips G on each side for the rockers K, which are connected by a rod, I, (around which there is a coiled spring) with the crank and handle-rod M, in order to produce sufficient pressure on the rubber-boards.

This rod and its attachments can be lifted off, by removing the inclined box-wedge O, after withdrawing the pin P, which is easily accomplished, for introducing or removing articles from between the rubber C, with its rounded strips or corrugations H and similar strips H', on the fixed bottom I of the machine.

The horizontal motion operates much like hand-washing on a board.

I am aware (on examination had) that the horizontal rubbing motion is not new, as it is shown in the patent of Josiah Webb, Feb. 11, 1868, as also in that of L. Wharton, Feb. 1, 1870, the latter being operated by a side lever in an outside bearing.

This lever is connected to the rubber by cords and pulleys. These cords speedily wear. In Patent No. 99,383 referred to, the combination of the straps, posts and lever are claimed, all arranged and operating in the manner set forth, all of which I disclaim, as my combinations differ substantially.

What I claim as my invention, is—

The combination and arrangement of the handle-like crank-rod M, slotted head-block D, reciprocating board C, guides G, press-rockers K with springs L, all combined and operating substantially in the manner and for the purpose specified.

B. R. HAND.

Witnesses:
WM. B. WILEY.
JACOB STAUFFER.